US006432491B1

(12) United States Patent
Blatter et al.

(10) Patent No.: US 6,432,491 B1
(45) Date of Patent: Aug. 13, 2002

(54) METHOD FOR PRODUCING MULTI-LAYER PAINT COATINGS

(75) Inventors: Karsten Blatter, Erftstadt; Werner Lenhard, Wuppertal, both of (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/700,650

(22) PCT Filed: Mar. 14, 2000

(86) PCT No.: PCT/EP00/02231

§ 371 (c)(1), (2), (4) Date: Mar. 7, 2001

(87) PCT Pub. No.: WO00/58026

PCT Pub. Date: Oct. 5, 2000

(30) Foreign Application Priority Data

Mar. 25, 1999 (DE) ........................................ 199 13 446

(51) Int. Cl.$^{7}$ .................................................. C08J 7/18

(52) U.S. Cl. ................. 427/514; 427/385.5; 427/407.1; 427/508; 427/553; 427/557; 427/559; 427/595

(58) Field of Search ................................ 427/514, 557, 427/559, 595, 385.5, 407.1, 508, 553

(56) References Cited

U.S. PATENT DOCUMENTS 5,854,337 A 12/1998 Wandelmaier et al.

FOREIGN PATENT DOCUMENTS

| | | |
|---|---|---|
| DE | 4123860 | 1/1993 |
| DE | 4226243 | 2/1994 |
| DE | 4226270 | 2/1994 |
| DE | 19709560 | 5/1998 |
| DE | 19818735 A1 | 10/1999 |
| EP | 476388 | 3/1992 |
| EP | 542209 | 5/1993 |
| WO | WO 98/00452 | 1/1998 |

*Primary Examiner*—Bernard Pianalto
(74) *Attorney, Agent, or Firm*—Sudhir G. Deshmukh

(57) ABSTRACT

A process for multilayer lacquering, wherein a surfacer coating compound is applied to an optionally precoated substrate and then cured, a top coat layer of a color-imparting and/or special effect-imparting base coat and a clear coat coating compound or of a pigmented one-coat top coat coating compound is applied to the surfacer layer obtained and cured, wherein, after application of the surfacer coating compound, the not yet cured surfacer layer is irradiated with NIR radiation in the wave length range from 760 to 1500 nm.

9 Claims, No Drawings

METHOD FOR PRODUCING MULTI-LAYER PAINT COATINGS

The invention relates to a process for multilayer lacquering with, in particular, waterborne lacquers which finds application in particular in the field of vehicle refinishing.

For ecological reasons, attempts are being made to an increasing degree to replace solvent-based lacquers by waterborne lacquers, also in the field of vehicle refinishing. The waterborne lacquers developed have already achieved a quality level which makes them equal in quality to solvent-based lacquers in terms of a majority of properties. Some properties have not yet, however, reached the quality level of solvent-based lacquers. For example, when water-thinnable surfacers are used, inadequate sandability is observed. Moreover, it is difficult to guarantee a uniform quality of the coating, particularly with regard to surface properties and inter-layer adhesion, under different external conditions. Under conditions of greatly varying atmospheric humidity it is particularly difficult to obtain reproducible drying of waterborne lacquers and a resulting uniform surface quality of the lacquering.

The object of the invention was, therefore, to provide a process for multilayer lacquering, more particularly for vehicle refinishing, which makes it possible, even when waterborne surfacer coating compounds are used, to obtain surfacer layers with a high and uniform quality of the lacquering, particularly with regard to the surface properties and inter-layer adhesion. The uniform quality of the lacquering should also be guaranteed in particular under greatly varying ambient conditions during application, e.g., atmospheric humidity. A uniform quality of the lacquering should also be obtained at critical places such as beads or edges. Moreover, it should be possible to sand the surfacer layers obtained satisfactorily and rapidly.

It became apparent that this object may be achieved if a surfacer layer applied to an optionally precoated substrate is irradiated with NIR radiation. The invention therefore provides the use of NIR radiation for irradiating surfacer layers during the multilayer lacquering of substrates.

The NIR (near infra-red) radiation used according to the invention is short-wave infra-red radiation in the wave length range from about 760 to about 1500 nm, preferably 760 to 1200 nn.

The invention also provides a process for multilayer lacquering in which a surfacer coating compound is applied to an optionally precoated substrate and is then cured, a top coat layer of a colour-imparting and/or special effect-imparting base coat and a clear coat coating compound or of a pigmented one-coat top coat coating compound is applied to the surfacer layer obtained and cured, which is characterised in that, after application of the surfacer coating compound, the not yet cured surfacer layer is irradiated with NIR radiation in the wave length range from 800 to 1500 nm. According to a preferred embodiment of the invention, a waterborne surfacer coating compound is applied. It is also possible, however, to use solvent-containing surfacer coating compounds.

After application of the waterborne surfacer coating compound in particular, the not yet cured surfacer layer obtained may optionally undergo a flash-off phase. According to a preferred embodiment of the invention, irradiation with NIR radiation is carried out to dry the waterborne surfacer layer in particular.

Curing of the waterborne surfacer layer (final curing) may be carried out with a suitable curing process. It may be carried out, for example, at room temperature, by forced drying at relatively high temperatures, by irradiation with UV or IR or NIR radiation. Final curing with UV or NIR radiation is preferred.

It is also possible, however, to carry out curing of the surfacer layer after an optional flash-off phase only with a single NIR irradiation phase.

The use of NIR radiation in general for drying paints and lacquers is well known. Examples of potential applications include the following sectors: printing industry, film drying, pipe drying, wood coatings, powder coatings. Examples of particular advantages of NIR technology include the very rapid drying, particularly in the case of waterborne lacquers, and the gentle drying due to low heating of the substrate. Nothing is known about the potential applications of this technology in vehicle lacquering, particularly vehicle refinishing.

Surprisingly, it has now been found that the object of the present invention may be achieved by the use of NIR radiation for drying and curing waterborne surfacer layers in particular in a multilayer structure. It was also surprising that the surfacer could be dried directly with NIR radiation at all. Rather, in view of the great film thickness and the surfacer surface which coheres rapidly as a result of irradiation, it was to be expected that a considerable property gradient from the film surface to the interface with the substrate in terms of hardness, sandability and adhesion would be obtained.

The irradiation with NIR radiation carried out in the process according to the invention may be carried out with a conventional high-energy NIR radiator. NIR radiators of this kind are available commercially (for example, from Industrie SerVis). These are, for example, high output halogen radiators with a radiation density from generally more than 1 $W/cm^2$, preferably more than 10 $W/cm^2$ to, for example, 15 $MW/m^2$. The radiators reach a radiator surface temperature, for example, (coiled filament temperature) of more than 2000 K, e.g., from 2000 to 3000 K. For example, suitable radiators have an emission spectrum with a maximum between 750 and 1200 nm.

According to the invention, a flash-off phase may be included prior to irradiation with NIR radiation. The flash-off phase may be carried out in the usual way, for example, by leaving the article to stand in the air or by blowing on air, e.g., at temperatures from 10° C. to 80° C., for example, at room temperature.

Examples of surfacer coating compounds which may be used in the process according to the invention include conventional waterborne surfacers known to the skilled person, of the kind used in the field of vehicle lacquering, particularly vehicle refinishing. The surfacer coating compounds contain water-thinnable binders. The water-thinnable binders are the conventional binders known to the skilled person for this application. They may be, for example, one-pack or two-pack water-thinnable binder systems.

Examples of one-pack binder systems are those based on polyurethane, polyacrylic, polyester and/or epoxy resins. The one-pack binder systems may be, e.g., physically or oxidation drying.

Examples of two-pack crosslinkable binder systems are those based on hydroxy-functional binders such as, e.g., polyurethane, polyester urethane and/or polyacrylate polyols, and polyisocyanates based on epoxide/polyamine systems, based on acetoacetyl-functional and (meth) acryloyl-functional binders and based on acryloyl-functional or acryloyl- and glycidyl-functional binders and polyamines. Examples of the above-mentioned binder systems are described in more detail in DE-A-41 23 860, DE-A-42 26 243, DE-A-42 26 270, EP-A-542 209 and EP-A-476 388.

It is also possible to use water-thinnable binders which can be cured at least partially by high-energy radiation, preferably UV radiation. These are preferably binders which may be cured by free-radicals. Preferred binders which may be cured by free-radicals are prepolymers such as poly- or oligomers which have olefinic double bonds capable of free-radical polymerisation, particularly in the form of (meth)acryloyl groups in the molecule. The prepolymers may be present in combination with reactive thinners, i.e. reactive liquid monomers.

Examples of prepolymers or oligomers are (meth) acryloyl-functional (meth)acrylic copolymers, epoxy resin (meth)acrylates, polyester (meth)acrylates, polyether (meth) acrylates, polyurethane (meth)acrylates, unsaturated polyesters, unsaturated polyurethanes or silicone (meth) acrylates with number-average molecular masses (Mn) preferably in the range from 200 to 10,000, particularly preferably from 500 to 3000 and with an average of, per molecule, 2 to 20, preferably 3 to 10 olefinic double bonds capable of free-radical polymerisation.

If present, reactive thinners are used in amounts from 1 to 50 wt. %, preferably from 5 to 30 wt. %, based on the total weight of prepolymers and reactive thinners. They are low molecular weight defined compounds which may be mono-, di- or polyunsaturated. Examples of such reactive thinners are: (meth)acrylic acid and esters thereof, maleic acid and half esters thereof, vinyl acetate, vinyl ethers, substituted vinyl ureas, ethylene- and propylene glycol di(meth) acrylate, butane 1,3- and 1,4-diol di(meth)acrylate, vinyl (meth)acrylate, allyl (meth)acrylate, glycerol tri-, di- and mono(meth)acrylate, trimethylol propane tri-, di- and mono (meth)acrylate, styrene, vinyl toluene, divinyl benzene, pentaerythritol tri- and tetra(meth)acrylate, di- and tripropylene glycol di(meth)acrylate, hexane diol di(meth)acrylate, and mixtures thereof.

Examples of UV-curing binders which may be used are those described in DE-A-41 33 290.

The binder systems mentioned here as being suitable for surfacer coating compounds are listed only by way of example. The binder systems may also be modified to a greater degree and various crosslinking mechanisms may be combined with one another, for example, curing by means of UV radiation may be combined with a further crosslinking mechanism. Examples of the latter combination are described in the as yet unpublished German patent application of the same Applicant P 198 187 35 and in WO-A-9800452 and DE-A-197 09 560.

The surfacer coating compounds which may be used in the process according to the invention contain fillers and/or pigments. These are the conventional fillers which may be used in the lacquer industry and organic or inorganic colour-imparting and/or anticorrosive pigments. Examples of colour-imparting pigments are titanium dioxide, micronised titanium dioxide, iron oxide pigments, carbon black, azo pigments, phthalocyanine pigments, quinacridone or pyrrolopyrrole pigments. Zinc phosphate is an example of an anticorrosive pigment. Examples of fillers are silica, aluminium silicate, barium sulfate, calcium carbonate and talc.

When selecting the fillers it has proved advantageous to use barium sulfate in the surfacers in amounts of at least 2 wt. %, based on the total surfacer coating compound.

The surfacer coating compounds may also contain water and small amounts of organic solvents and conventional lacquer additives.

The organic solvents optionally present in the surfacer coating compounds are conventional lacquer solvents. These may originate from the preparation of the binders or may be added separately. They are preferably water-miscible solvents.

Examples of suitable solvents are mono- or polyhydric alcohols, e.g., propanol, butanol, hexanol; glycol ethers or esters, e.g., diethylene glycol dialkyl ether, dipropylene glycol dialkyl ether, in each case with C1 to C6-alkyl, ethoxypropanol, butyl glycol; glycols, e.g., ethylene glycol, propylene glycol and oligomers thereof, N-methyl pyrrolidone and ketones, e.g., methyl ethyl ketone, acetone, cyclohexanone; aromatic or aliphatic hydrocarbons, e.g., toluene, xylene or linear or branched aliphatic C6–C12 hydrocarbons.

The surfacer coating compounds may also contain conventional lacquer additives. Examples of conventional lacquer additives are levelling agents, rheology modifiers such as fine-particle silica or polymeric urea compounds, thickeners such as partially crosslinked polycarboxylic acid or polyurethanes, defoamers, wetting agents, anti-crater agents and curing accelerators. The additives are used in conventional amounts known to the skilled person.

If UV radiation-curing binders are used, the surfacer coating compounds also contain photoinitiators, e.g., in amounts from 0.1 to 5 wt. %, preferably from 0.5 to 3 wt. %, based on the sum of prepolymers capable of free-radical polymerisation, reactive thinners and photoinitiators. Examples of photoinitiators are benzoin and derivatives, acetophenone and derivatives, e.g., 2,2-diacetoxyacetophenone, benzophenone and derivatives, thioxanthone and derivatives, anthraquinone, 1-benzoylcyclohexanol, organophosphorus compounds such as, e.g., acyl phosphine oxides. The photoinitiators may be used on their own or in combination.

In the case of two-pack coating compounds, the binder components which react together must be stored separately and may be mixed together only shortly before application.

Generally, spray viscosity may be obtained prior to application by means of water or organic solvents, if necessary.

The application of the surfacer coating compounds in the process according to the invention may be carried out by conventional methods, preferably by spraying.

Suitable substrates are metal and plastics substrates, particularly the substrates known in the automotive industry, such as, e.g., iron, zinc, aluminium, magnesium, refined steel or alloys thereof, and polyurethanes, polycarbonates or polyolefins. The surfacer layers may be applied to optionally pretreated substrates as such or to conventional primers, for example, to bright steel plate, ground, to polyvinylbutyral primer, 2-pack epoxy primers, partially ground shop or old lacquerings.

After application and an optional brief flash-off phase of, e.g., 5 to 15 minutes at room temperature, irradiation takes place with NIR radiation. Irradiation may be carried out, for example, in a belt plant fitted with an NIR radiator or with an NIR radiator which is positioned in front of the article or place to be irradiated.

The first possibility mentioned is suitable, e.g., for refinishing individual parts, wherein it is possible to vary the belt speed and thus the irradiation time. For example, belt speeds from 1.0 to 7.0 m/min may be obtained, which may correspond, for example, to irradiation times from 2 to 20 s. The distance between NIR radiator and article surface may be, e.g., 10 to 60 cm.

In the second possibility, the NIR radiator is positioned directly in front of the article or place to be irradiated. The irradiation time may be, e.g., 1 to 300 s, the distance from the article, e.g., 5 to 70 cm.

By specifically selecting the various parameters such as belt speed, irradiation time and distance from article, and naturally depending on the radiation output of the NIR radiator used, different article temperatures may be obtained. For example, article temperatures from 80° C. to 1 50° C. may be obtained.

After irradiation of the surfacer layer with NIR radiation, final curing may then take place according to the preferred embodiment. Depending on the binder system used, final curing may take place, e.g., at room temperature by means of heat, e.g., in an oven or with IR or NIR radiation or with high-energy radiation, preferably UV radiation. Various methods may also be combined with one another. Final curing is carried out preferably with a further NIR irradiation step or, if binders that can be cured by means of high-energy radiation are used, by UV radiation.

In the case of final curing with NIR radiation, irradiation may be carried out in a similar manner to that already described above, i.e., there follows a further irradiation phase or a further belt pass. The irradiation times may be varied according to requirements. They may be, for example, in the range from 1 to 300 seconds.

In the case of final curing with UV radiation, the surfacer layer may be irradiated preferably with UV radiation sources with emissions in the wave length range from 180 to 420 nm, particularly from 200 to 400 nm. Examples of UV radiation sources which may be used include mercury high pressure, medium pressure and low pressure radiators and doped radiators such as iron or gallium mercury lamps. Other examples of UV radiation sources are gas discharge tubes such as, e.g., xenon low pressure lamps, UV laser, UV point sources such as, e.g., UV-emitting diodes and black light tubes. Apart from these continuously operating UV radiation sources, it is also possible, however, to use discontinuous UV radiation sources. These are preferably so-called high-energy flash devices (abbreviated to UV flash lamps).

The irradiation time with UV radiation may be, for example, in the range from 1 millisecond to 400 seconds, preferably from 4 to 160 seconds if UV flash lamps are used as the UV radiation source, depending on the number of flash discharges selected. The flashes may be triggered, for example, every 4 s. Curing may take place, for example, as a result of 1 to 40 successive flash discharges. If continuous UV radiation sources are used, the irradiation time may be, for example, in the range from 1 millisecond to a few seconds to about 5 minutes, preferably less than 5 minutes. The distance between the UV radiation sources and the substrate surface to be irradiated may be, for example, 5 to 60 cm. UV radiation sources and UV technology are known to the skilled person.

It is also possible, though less preferred, to carry out drying and curing of the surfacer layer with a single NIR irradiation step. The irradiation times may then be, for example, 5 to 300 seconds.

After curing, the surfacer layers are overcoated with a top coat layer. The top coat layer may be pigmented one-coat top coats or a base coat/clear coat two-layer structure. Overcoating may be carried out with solvent-based or waterborne coating compounds.

Colour-imparting and/or special effect-imparting base coats which may be used for the base coat/clear coat top coating include all the solvent-based or waterborne base coats known to the skilled person and conventionally used in vehicle lacquering, particularly refinishing. Examples of solvent-based base coats include those based on polyacrylic and/or polyester resins, optionally in combination with melamine resins and cellulose esters. Examples of waterborne lacquers include those based on physically drying polyurethane, polyurethane/urea, polyester-polyester urethane and/or polyacrylic resins and modifications thereof, such as, e.g., acrylated or silicon-modified polyurethane and/or polyester resins. Waterborne lacquers of chemically crosslinking binder components, e.g., hydroxyl group-containing binders and polyisocyanate crosslinking agents are also suitable. Curing of the base coat layer may be carried out at room temperature or by forced drying at, for example, 40° C. to 80° C. The base coat layer may also, however, be overcoated wet in wet with a clear coat, optionally after a brief flash-off phase, and then cured together with the clear coat.

Clear coats which may be used for the base coat/clear coat/top coating include all the solvent-based or waterborne clear coats known to the skilled person and conventionally used in vehicle lacquering, particularly refinishing. Examples thereof are solvent-based or waterborne clear coats based on hydroxyl group-containing and/or amino group-containing binders and polyisocyanate crosslinking agents and based on amino group-containing and acryloyl group-containing binders.

Pigmented one-coat top coats which may be used for the top coating include all the solvent-based or waterborne one-coat top coats known to the skilled person and conventionally used in vehicle lacquering, particularly refinishing. Examples thereof are solvent-based or waterborne one-coat top coats based on hydroxyl group-containing and/or amino group-containing binders and polyisocyanate crosslinking agents and based on amino group-containing and acryloyl group-containing binders.

The top coat layers (clear coat, base coat/clear coat wet in wet, one-coat top coat) may be dried, for example, over a relatively long period, e.g., within 18 hours (overnight), at room temperature. They may also, however, undergo drying at relatively high temperatures, for example for 20 to 50 minutes at, e.g., 40° C. to 60° C., optionally after a flash-off time of about 10 to 30 minutes.

It is also possible to cure the top coat layers by means of high-energy radiation, preferably UV radiation, if appropriate binders are used. The binders to be used here are the binders already mentioned above which can be cured at least partially by high-energy radiation.

The process according to the invention is used preferably in vehicle and vehicle part lacquering, particularly vehicle refinishing. It may also, however, be used in vehicle production line lacquering, particularly refinishing in vehicle production line lacquering.

Surfacer layers obtained with the process according to the invention can be sanded very satisfactorily wet and dry after curing has ended. A uniform reproducible quality of the surfacer layer is obtained in terms of inter-layer adhesion and surface quality, even when the external conditions vary, particularly with a very varying atmospheric humidity. Similarly, a uniform quality of the lacquering, particularly in terms of appearance and flow, is also guaranteed at critical places such as beads or edges. Naturally, the extremely short drying time which is obtained with the process according to the invention is also an advantage. If final curing also takes place with NIR radiation or with UV radiation, this process step is also shortened considerably. The throughput times, for example, in a refinishing shop, may be substantially shortened as a result, and this improves the profitability of the shop as a whole. The invention will be explained in more detail on the basis of the following examples.

EXAMPLE 1

A surfacer coating compound based on a water-thinnable two-pack epoxy/amine system was prepared according to DE-A-196 25 345 Example Surfacer I. The surfacer was applied at 40% and at 70% relatively humidity to an appropriately prepared wing of a motor vehicle coated with a conventional primer in a resulting dry film layer thickness of about 80 μm. After a 10 minute flash-off time at room temperature, irradiation was carried out in each case with an NIR radiator (500 W/cm$^2$) to dry the surfacer. The radiator/article distance was 10 cm in each case, the irradiation time 10 s. Final curing of the surfacers took place after 5 minutes with a second NIR irradiation step under the same conditions but with an irradiation time of 15 s in each case.

A waterborne lacquer (prepared according to DE-A-196 43 802, Example of preparation 4) was applied in each case to the cured surfacer layers in a resulting dry film layer thickness from 13 to 15 μm. After a flash-off phase of 25 minutes at room temperature, a solvent-based clear coat (based on OH-functional acrylic resin/polyisocyanate crosslinking agent) was applied in each case in a resulting dry film layer thickness of 50 μm. After a flash-off phase of 10 minutes at room temperature, the base coat and clear coat were cured together in each case within a period of 30 minutes at 60° C.

EXAMPLE 2

A surfacer based on a UV radiation-curing binder system was prepared. To this end, the following components were mixed together and homogenised for a few minutes by means of a high-speed stirrer (all details are based on the weight):

131 parts of a commercial aromatic epoxy acrylate (Ebecryl® 600 from UCB)
56 parts of hexane diol diacrylate
9 parts of a commercial adhesion promoter
127 parts of commercial barytes
126 parts of commercial kaolin
6.1 parts of a mixture of commercial photoinitiators (aryl phosphine oxide and acetophenone derivative).
113 parts of butyl acetate.

The surfacer was applied at 40% and at 70% relative humidity to an appropriately prepared wing of a motor vehicle coated with a conventional primer in a resulting dry film layer thickness of about 60 μm. After a 10 minute flash-off time at room temperature, irradiation was carried out in each case with an NIR radiator (500 W/cm$^2$). The distance between radiator/article was 10 cm, the irradiation time 10 s in each case.

After 5 minutes, final curing was carried out by irradiation with UV light by means of a UV flash lamp (3500 Ws). Irradiation was carried out with 30 flashes (about 120 s) in each case from a distance of about 20 cm.

Comparison of Results in Terms of Lacquer Properties

The wings coated with the surfacer according to example 1 and 2 exhibit a uniform, even surface quality all over the article including beads and edges both at 40% relative humidity and at 70% relative humidity.

| | Example 1 | Example 2 |
|---|---|---|
| Sandability | Good | Good |
| Adhesion (1) surfacer/substrate | 2 | 2 |
| Adhesion (1) surfacer/top coat | 2 | 2 |
| Adhesion (1) after humidity/heat cycle test (2) | 2 | 2 |
| Appearance (build, gloss, flow) | Satisfactory | Satisfactory |

(1) Cross-cut test according to DIN 53151
(2) Humidity/heat cycle test according to DIN 50017

The same above-mentioned results were obtained in examples 1 and 2 at 40% and at 70% relative humidity in each case.

What is claimed is:

1. A process for multilayer lacquering comprising the steps of:

applying a surfacer coating compound to a substrate;

irradiating the surfacer coating compound with NIR radiation in a wave length range of 760 to 1500 nm; and applying a top coat layer selected from the group consisting of a color-imparting base coat and a clear coat coating compound, a special effect-imparting base coat and a clear coat coating compound, a color-imparting and special effect-imparting base coat and a clear coat coating compound;

and a pigmented one-coat top coat coating compound to the surfacer layer obtained.

2. A process according to claim 1, wherein the surfacer coating compound is a waterborne surfacer coating compound.

3. A process according to claim 2, wherein the waterborne surface layer undergoes a flash-off phase prior to irradiation with NIR radiation.

4. A process according to claim 1, wherein the substrate is selected from the group consisting of vehicle bodies and parts thereof.

5. The process according to claim 4, wherein the substrate is precoated.

6. A process according to claim 1, wherein irradiation with NIR radiation is carried out for the purpose of drying.

7. A process according to claim 6, further comprising the step of final curing of the surfacer coating compound, wherein the final curing is carried out after irradiation with NIR radiation using a method selected from the group consisting of forced drying at relatively high temperatures, irradiating with UV radiation, irradiating with IR radiation, and irradiating with combinations thereof.

8. A process according to claim 1, wherein irradiation with NIR radiation is carried out in one or more irradiation steps until the surfacer coating compound is cured.

9. A process for refinishing a substrate comprising the process for multilayer lacquering according to claim 1, wherein the substrate is selected from the group consisting of vehicle bodies and parts thereof.

* * * * *